(12) United States Patent
Chao et al.

(10) Patent No.: US 10,509,403 B2
(45) Date of Patent: Dec. 17, 2019

(54) MOVABLE SMART FIRE EXTINGUISHING DEVICE

(71) Applicants: Kang Chao, Taoyuan (TW); Yung-Tai Chao, Taoyuan (TW)

(72) Inventors: Kang Chao, Taoyuan (TW); Yung-Tai Chao, Taoyuan (TW)

(*) Notice: Subject to any disclaimer, the term of this patent is extended or adjusted under 35 U.S.C. 154(b) by 0 days.

(21) Appl. No.: 16/169,795

(22) Filed: Oct. 24, 2018

(65) Prior Publication Data

US 2019/0129428 A1 May 2, 2019

(30) Foreign Application Priority Data

Oct. 27, 2017 (TW) .............................. 106137052 A (51) Int. Cl.
*G05D 1/00* (2006.01)
*A62C 27/00* (2006.01)
(Continued)

(52) U.S. Cl.
CPC ........... *G05D 1/0094* (2013.01); *A62C 27/00* (2013.01); *A62C 31/24* (2013.01); *G05D 1/028* (2013.01);
(Continued)

(58) Field of Classification Search
CPC ........... B64D 1/16; A62C 35/60; A62C 37/36; A62C 99/00; A62C 27/00; A62C 3/10; A62C 3/0292; A62C 35/68; A62C 37/44; A62C 3/00; A62C 31/24; A62C 37/50; B64C 27/00; B64C 39/022; B64C 39/024; B64C 39/02; B60R 25/102; B60R 25/04; B60R 25/252; B60R 25/33; B60R 25/00; B60R 25/10; G06Q 10/025; G06Q 10/06312; G06Q 10/06311; G05D 1/0858; G05D 1/0094; G05D 1/104; G05D 1/0661; G05D 1/0234; G05D 1/0246; G05D 1/028; G01B 11/2518; G09B 25/04; G06F 17/5004; G01S 17/023; G01S 17/42; G01S 17/89; G01S 7/4808; G01S 17/87; G01C 3/08; G01C 15/008; G01F 1/34; B63B 35/00; B63B 35/4413; B63B 1/107;
(Continued)

(56) References Cited

U.S. PATENT DOCUMENTS 4,471,708 A * 9/1984 Wilson ..................... A62C 3/10
114/265
2011/0174383 A1 * 7/2011 Combs ................... A62C 27/00
137/12

(Continued)

*Primary Examiner* — Behrang Badii
(74) *Attorney, Agent, or Firm* — Hamre, Schumann, Mueller & Larson, P.C.

(57) ABSTRACT

A fire extinguishing device is configured to, in response to a location signal from a fire detector: move to a first reference location; detect a fire and generate a thermal image, and calculate a target direction based on a line of sight and the thermal image; rotate such that the line of sight is aligned with the target direction, and detect the fire and generate a first reference image; move in the target direction to a second reference location, and detect the fire and generate a second reference image; calculate a distance to fire and a height of the fire; move to a location within a predetermined range from the fire, move a tube to a spraying position based on the height of the fire, and discharge an extinguishing agent.

9 Claims, 6 Drawing Sheets

(51) Int. Cl.
   *A62C 31/24*   (2006.01)
   *G05D 1/02*    (2006.01)
   *B64C 39/02*   (2006.01)
   *B64C 27/00*   (2006.01)
   *B64D 1/16*    (2006.01)
   *A62C 99/00*   (2010.01)

(52) U.S. Cl.
   CPC ......... *G05D 1/0234* (2013.01); *G05D 1/0246* (2013.01); *A62C 99/00* (2013.01); *B64C 27/00* (2013.01); *B64C 39/02* (2013.01); *B64C 39/022* (2013.01); *B64D 1/16* (2013.01); *G05D 2201/02* (2013.01)

(58) Field of Classification Search
   CPC ....... B63B 39/03; E21B 35/00; G08B 27/001; G08B 25/003; G08B 25/004; G08B 25/006; G08B 25/016
   See application file for complete search history.

(56) References Cited

U.S. PATENT DOCUMENTS

2013/0134254 A1\* 5/2013 Moore ..................... B64D 1/16
                                                            244/17.11
2016/0121151 A1\* 5/2016 Schmitt .................. A62C 35/60
                                                            169/46

\* cited by examiner

MOVABLE SMART FIRE EXTINGUISHING DEVICE

CROSS-REFERENCE TO RELATED APPLICATION

This application claims priority of Taiwanese Patent Application No. 106137052, filed on Oct. 27, 2017.

FIELD

The disclosure relates to a fire extinguishing device, and more particularly to a movable smart fire extinguishing device.

BACKGROUND

A conventional fire alarm system built in, for example, a manufacturing factory may include a plurality of fire detectors disposed at different locations in the factory, and a host communicating with the fire detectors. When one of the fire detectors detects fire, the one of the fire detectors may transmit a signal to the host. In response, the host generates an alert (e.g., flashing light, a siren, etc.) and a notification indicating the location of the one of the fire detectors. In this configuration, factory personnel may be notified of the location of the fire, so as to take the appropriate measures such as using a fire extinguisher to attempt to put out the fire.

The fire extinguisher may include a container that stores an extinguishing agent therein, a tube connected to the container, and a control mechanism that is operable to control spraying of the extinguishing agent. It is noted that in order to effectively put out fire, a distance between the fire extinguisher and the fire, and a direction in which the extinguishing agent is sprayed out are both important.

SUMMARY

One object of the disclosure is to provide a movable smart fire extinguishing device that can alleviate at least one of the drawbacks of the prior art.

According to the disclosure, the movable smart fire extinguishing device is for use with a fire detector disposed in a specific area to extinguish fire in the specific area. The movable smart fire extinguishing device includes a main body, a wheel-driving module, an extinguisher, an electronic switching module, a tube-driving module, a thermal detecting module, a wireless transmission module, and a processor.

The main body includes a base that includes a wheel set, and a frame that is mounted on the base.

The wheel-driving module is disposed on the base for driving the wheel set to move the main body within the specific area.

The extinguisher is placed in the frame and including a container that stores an extinguishing agent therein, an outlet that is connected to the container, a tube that is spatially connected to and extends from the outlet and that includes a nozzle, and a valve that is disposed at the outlet, and that can be switched between a block position in which the valve blocks the outlet and a release position in which the valve opens up the outlet to allow the extinguishing agent to be discharged through the outlet and the tube.

The electronic switching module is disposed on the frame, and is configured to drive the valve to switch between the block position and the release position.

The tube-driving module is disposed on the frame and is configured to move the nozzle of the tube in a vertical direction.

The thermal detecting module is disposed on the frame, facing a same side as the nozzle of the tube, and configured to detect fire within a field of view of the thermal detecting module and to generate an image of the fire.

The wireless transmission module is configured to receive a location signal associated with a first reference location in proximity of the fire detector.

The processor is electrically connected to the wheel-driving module, the electronic switching module, the tube-driving module, the thermal detecting module and the wireless transmission module.

The processor is programmed to, in response to the location signal from the wireless transmission module:
  generate a movement control signal based on the location signal, and transmit the movement control signal to the wheel-driving module for enabling the wheel-driving module to drive the wheel set to move the main body to the first reference location;
  when it is determined that the main body is at the first reference location, control the thermal detecting module to detect fire and to generate a thermal image, and to calculate a target direction based on a line of sight of the thermal detecting module and the thermal image;
  control the wheel-driving module to rotate the main body such that the line of sight of the thermal detecting module is aligned with the target direction, and then control the thermal detecting module to detect the fire and to generate a first reference image;
  control the wheel-driving module to drive the wheel set to move the main body in the target direction by a predetermined distance to a second reference location, and then control the thermal detecting module to detect the fire and to generate a second reference image;
  calculate a distance to fire between the fire and the main body at the second reference location, a height of the fire from the ground of the specific area based on image parts respectively of the first reference image and the second reference image that indicate a highest temperature;
  control the wheel-driving module to drive the wheel set to move the main body to a location spaced apart from the fire by a distance within a predetermined range;
  control the tube-driving module to move the nozzle of the tube to a spraying position based on the height of the fire; and
  control the electronic switching module to switch the valve to the release position so as to discharge the extinguishing agent.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
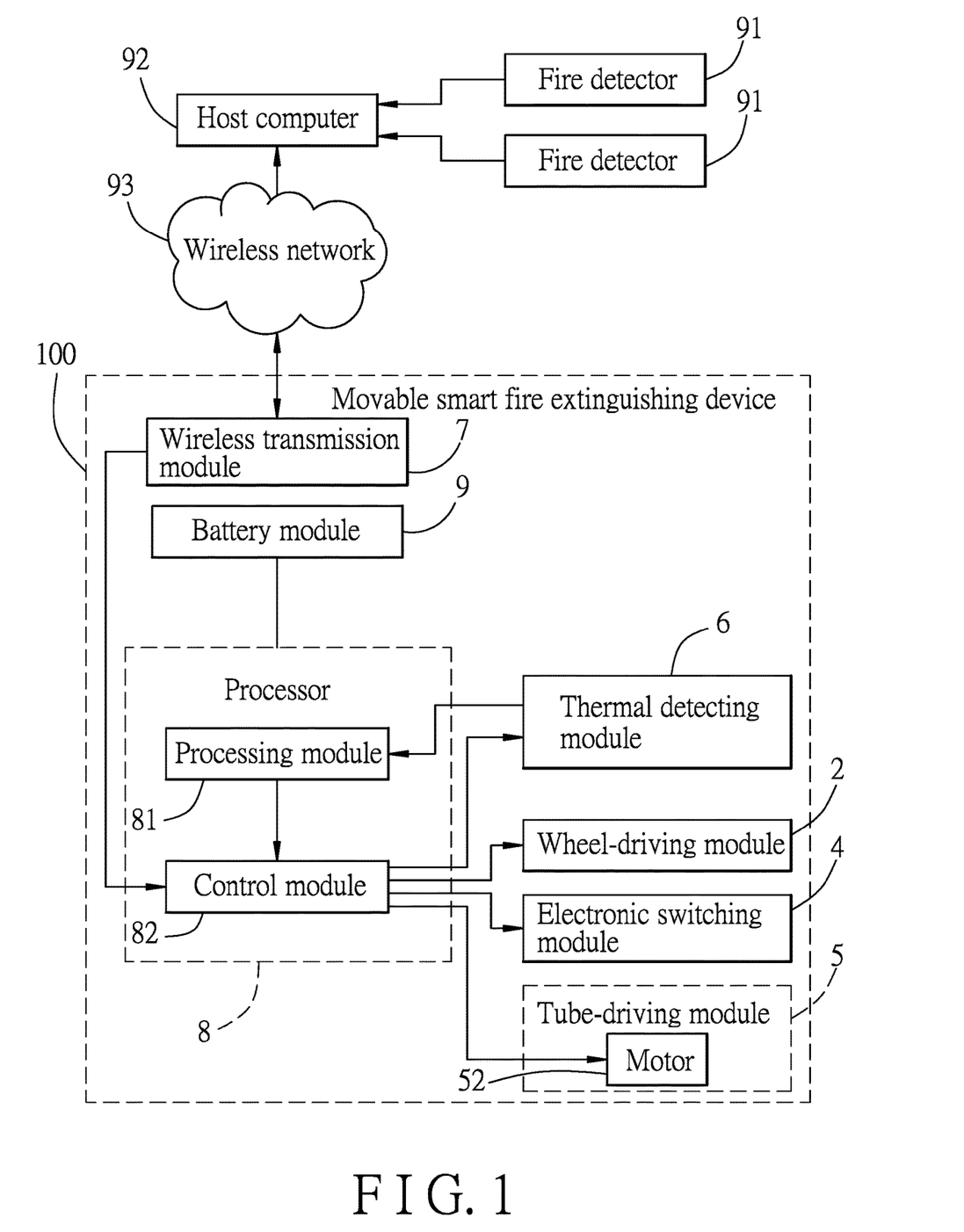
FIG. 1 is a block diagram illustrating a movable smart fire extinguishing device according to one embodiment of the disclosure.
Figure 2:
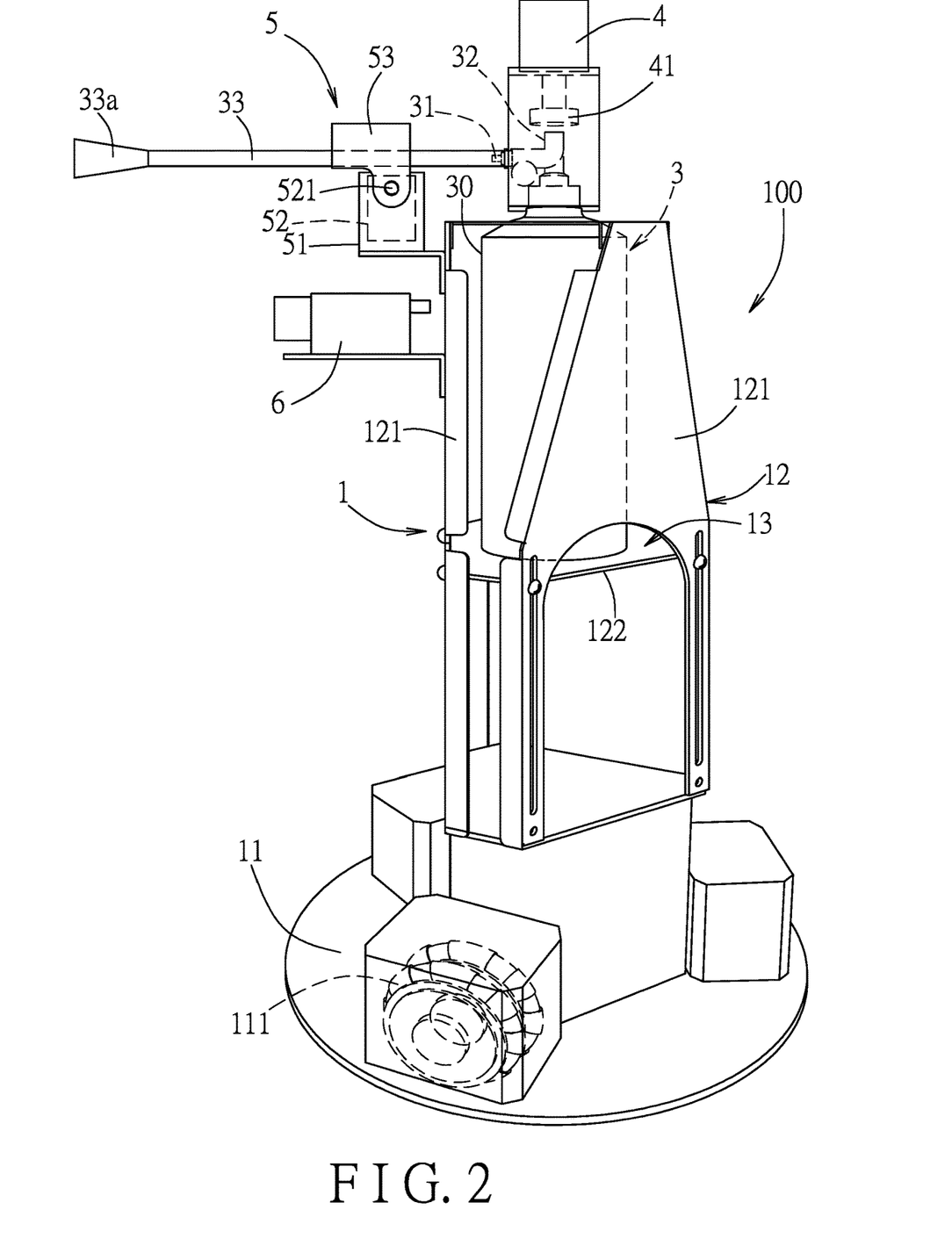
FIG. 2 is a schematic view of the movable smart fire extinguishing device according to one embodiment of the disclosure.

FIG. 1 is a block diagram illustrating a movable smart fire extinguishing device 100 according to one embodiment of the disclosure, and FIG. 2 is a schematic view of the movable smart fire extinguishing device 100 according to one embodiment of the disclosure.

The movable smart fire extinguishing device 100 includes a main body 1, a wheel-driving module 2, an extinguisher 3, an electronic switching module 4, a tube-driving module 5, a thermal detecting module 6, a wireless transmission module 7, a processor 8 and a battery module 9.

Figure 3:
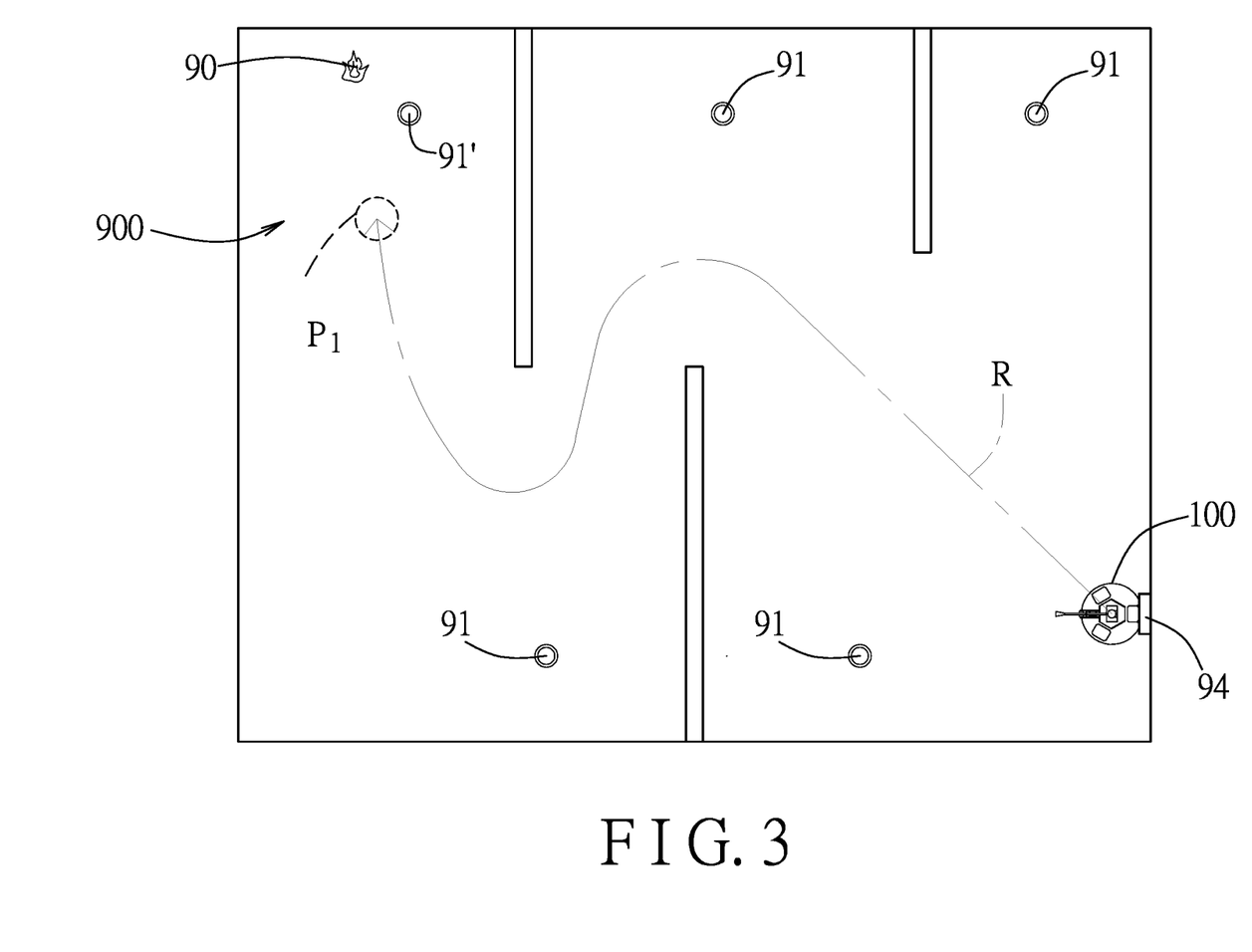
FIG. 3 is a schematic top view illustrating the movable smart fire extinguishing device moving along a fixed route to a first reference location.

The movable smart fire extinguishing device 100 may be for use with one or more fire detectors 91 disposed in a specific area 900, and a host computer 92, so as to extinguish fire 90 in the specific area 900 (see FIG. 3). In this embodiment, the specific area 900 may be a manufacturing factory, an office, a residence, etc. In other embodiments, the specific area 900 may be an outdoor area.

The main body 1 includes a base 11 that includes a wheel set 111, and a frame 12 that is mounted on the base 11. In this embodiment, the wheel set 111 includes three wheels.

The frame 12 is formed with a containing space 13 for containing the extinguisher 3 therein. In this embodiment, the frame 12 includes three side walls 121 (only two are visible) and a supporting board 122 that cooperatively define the containing space 13. Each of the side walls 121 extends upwardly from the base 11. The supporting board 122 is disposed within a space defined by the side walls 121 for supporting the extinguisher 3, and is movable in a vertical direction. In one configuration as seen in FIG. 2, the supporting board 122 may be screwed to each of the side walls 121 and is therefore movable in the vertical direction, so that a vertical position of the supporting board 122 can be adjusted.

The wheel-driving module 2 is disposed on the base 11, and is configured for driving the wheel set 111 to move the main body 1 within the specific area 900 based on a movement control signal.

The extinguisher 3 is placed inside the containing space 13 formed in the frame 12, and includes a container 30, an outlet 31 that is connected to the container 30, a tube 33, and a valve 32 that is disposed at the outlet 31.

The container 30 stores an extinguishing agent therein. The tube 33 may be made of a flexible material, is spatially connected to and extends from the outlet 31 at one end, and includes a nozzle 33a at the other end.

The valve 32 is operable to be switched between a block position, in which the valve 32 blocks the outlet 31, and a release position, in which the valve 32 opens up the outlet 31 to allow the extinguishing agent to be discharged through the outlet 31 and the tube 33.

The electronic switching module 4 is disposed on the frame 12, and is configured to drive the valve 32 to switch between the block position and the release position based on a first control signal. In this embodiment, the electronic switching module 4 may include a pressing mechanism 41 that presses the valve 32 for switching the valve 32 between the block position and the release position. For example, the pressing mechanism 41 is a linear actuator, and the electronic switching module 4 further includes an actuator controller for controlling operation of the linear actuator in response to receipt of the first control signal.

The tube-driving module 5 is disposed on the frame 12, and is configured to move the nozzle 33a of the tube 33 in the vertical direction.

In the embodiment of FIG. 2, the tube-driving module 5 includes a motor installation seat 51 that is mounted on the frame 12, a motor 52 that is mounted on the motor installation seat 51 and that includes a driving shaft 521, and a tube installation seat 53 that is connected to the driving shaft 521 and that is configured to co-rotate with the driving shaft 521 and to allow the tube 33 to be disposed therethrough.

The driving shaft 521 extends transversely and is perpendicular to the tube 33. The motor 52 is controlled to drive the driving shaft 521 to rotate, so as to rotate the tube installation seat 53 and then to move the nozzle 33a of the tube 33 in the vertical direction.

The thermal detecting module 6 is disposed on the frame 12, and faces a same side as the nozzle 33a of the tube 33. The thermal detecting module 6 is configured to detect fire within a field of view (FoV) of the thermal detecting module 6, and to generate an image of the fire.

In this embodiment, the thermal imaging module 6 includes a thermographic camera, and the image generated is a thermal radiation image, while in other embodiments, various imaging equipments may be employed.

The wireless transmission module 7 may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

The wireless transmission module 7 is configured to receive a location signal associated with a first reference location ($P_1$) in proximity of one of the fire detectors 91 that currently detects fire, in an example as shown in FIG. 3. It is noted that the location signal may be transmitted directly from the one of the fire detectors 91, or from the host computer 92.

In this embodiment, the processor 8 may be physically embodied to include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The processor 8 includes a processing module 81 and a control module 82.

The control module 82 is electrically connected to the wireless transmission module 7 for receiving the location signal therefrom, and is electrically connected further to the wheel-driving module 2, the electronic switching module 4, the tube-driving module 5 and the thermal detecting module 6 for controlling operations thereof.

The processing module 81 is electrically connected to the control module 82, and is electrically connected to the thermal detecting module 6 for receiving the image generated by the thermal detecting module 6. The processing module 81 is programmed to calculate a target direction toward the fire 90, a height of the fire and a distance to the fire.

The processing module 81 is further programmed to transmit, to the control module 82, a signal indicating the target direction, and the control module 82 is programmed to control the wheel-driving module 2 to rotate the main body 1 based on the signal from the processing module 81. Furthermore, the processing module 81 is further programmed to transmit signals for controlling the electronic switching module 4, the tube-driving module 5 and the thermal detecting module 6 to the control module 82, such that the control module 82 is able to control the operations of the electronic switching module 4, the tube-driving module 5 and the thermal detecting module 6 accordingly.

The battery module 9 is disposed on the base 11 and is electrically connected to the processor 8, and may include one or more rechargeable batteries. The battery module 9 is capable of supplying power needed for operation of the movable smart fire extinguishing device 100.

The host computer 92 may be embodied using a server computer, a personal computer, a laptop, a tablet, a mobile electronic device, etc. The host computer 92 includes a processor that is capable of performing the operations as described below, and is equipped with a communicating unit (not depicted in the drawings) that is capable of receiving signals from the fire detectors 91, and that can be controlled by the processor to transmit the location signal to the movable smart fire extinguishing device 100 over a wireless network 93 (e.g., the Internet).

In use, when one of the fire detectors 91 (e.g., the fire detector 91' as shown in FIG. 3) detects a fire 90, the fire detector 91' transmits the location signal to the host computer 92 (see FIG. 1). In response, the host computer 92 forwards the location signal to the wireless transmission module 7 of the movable smart fire extinguishing device 100. In some embodiments, the fire detector 91' directly transmits the location signal to the wireless transmission module 7 of the movable smart fire extinguishing device 100.

In some embodiments, the fire detector 91' transmits an alert signal that indicates an identity of the fire detector 91' (e.g., includes an assigned serial number of the fire detector 91') to the host computer 92, and in response, the host computer 92 generates the location signal based on the alert signal and transmits the location signal to the wireless transmission module 7 of the movable smart fire extinguishing device 100.

In response to receipt of the location signal, the control module 82 generates a movement control signal based on the location signal, and transmits the movement control signal to the wheel-driving module 2, for enabling the wheel-driving module 2 to drive the wheel set 111 to move the main body 1 to the first reference location ($P_1$) in proximity of the fire detector 91'.

It is noted that initially, the movable smart fire extinguishing device 100 is located at an initial location. In this embodiment, the initial location is a recharge dock 94 for recharging the battery module 9. In such a case, the control module 82 of the processor 8 is programmed to, when it is determined that the main body 1 is located at the initial location, generate the movement control signal that controls the wheel-driving module 2 to drive the wheel set 111 to move the main body 1 to the first reference location ($P_1$) along a predetermined fixed route (R).

Figure 4:
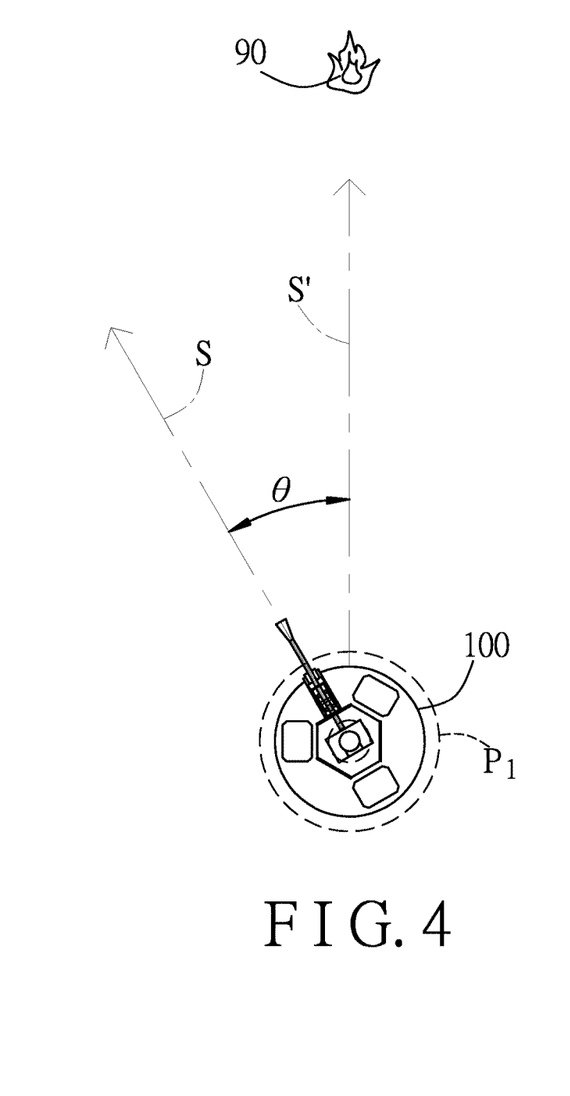
FIG. 4 is a schematic top view illustrating a line of sight of a thermal detecting module and a target direction.

As shown in FIG. 4, the processor 8 is programmed to, when it is determined that the main body 1 is at the first reference location ($P_1$) (e.g., when it is determined that the wheel-driving module 2 has driven the wheel set 111 to move the main body 1 for the entirety of the fixed route (R)), control the thermal detecting module 6 to detect fire within the field of view centered at a line of sight (S), and generate a thermal image. The processing module 81 of the processor 8 is programmed to, subsequently, calculate a target direction (S') based on the line of sight (S) of the thermal detecting module 6 and the thermal image.

In this embodiment, the processing module 81 first calculates an angle θ between the target direction (S') and the line of sight (S), using the movable smart fire extinguishing device 100 as a vertex.

The angle θ may be calculated using the following equation:

$$\theta = \frac{x_h - 0.5R_h}{0.5R_h} \times 0.5A_h,$$

where $x_h$ represents a number of pixels between a location of the fire 90 in the thermal image and a central location of the thermal image in a horizontal direction, $R_h$ represents a number of pixels of the entire thermal image in a horizontal direction (which may be a known value, such as 320, that is related to a specification of the thermal detecting module 6), and $A_h$ represents a horizontal angle of view of the FoV of the thermal detecting module 6 (which may be a known value, such as 48 degrees, that is related to a specification of the thermal detecting module 6).

It is noted that, the calculated angle θ may be of a positive value or a negative value. When it is determined that the calculated angle θ has a positive value, the target direction (S') is reached by turning the thermal detecting module 6 clockwise from the line of sight (S) by the value of the angle θ. On the other hand, when it is determined that the calculated angle θ has a negative value, the target direction (S') is reached by turning the thermal detecting module 6 counterclockwise from the line of sight (S) by the value of the angle θ.

In one embodiment, in order to eliminate the possibility that the fire 90 is not captured in the thermal image, when it is determined that the main body 1 has moved to the first reference location ($P_1$), the processor 8 further controls the wheel-driving module 2 to drive the wheel set 111 to rotate the main body 1 at the first reference location ($P_1$), controls the thermal detecting module 6 to generate a plurality of thermal images, and calculates the target direction (S') based on the plurality of thermal images.

Figure 5:
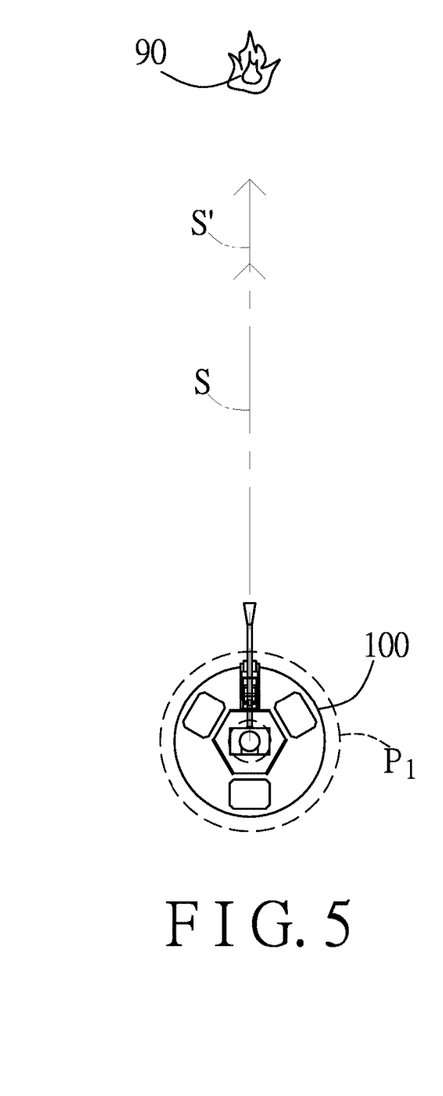
FIG. 5 is a schematic top view illustrating the movable smart fire extinguishing device being rotated such that the line of sight is aligned with the target direction.

After the target direction (S') is obtained, the processor 8 controls the wheel-driving module 2 to drive the wheel set 111 to rotate the main body 1 at the first reference location ($P_1$) by the angle θ, such that the line of sight (S) aligns with the target direction (S'), as illustrated in FIG. 5. Then, the processor 8 controls the thermal detecting module 6 to detect the fire 90 and to generate a first reference image. Specifically, the first reference image is also a thermal image.

Figure 6:
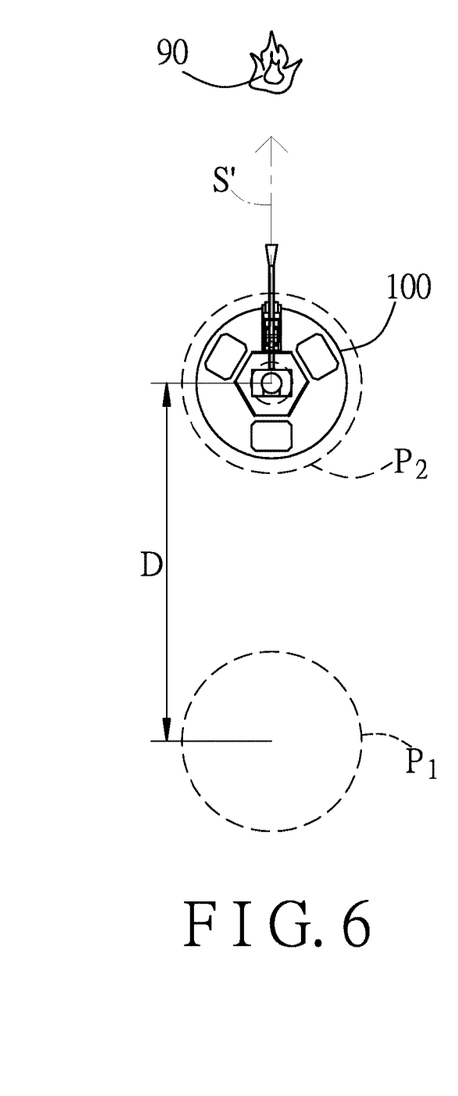
FIG. 6 is a schematic top view illustrating the movable smart fire extinguishing device moving to a second reference location.

Then, as shown in FIG. 6, the processor 8 controls the wheel-driving module 2 to drive the wheel set 111 to move the main body 1 in the target direction (S') by a predetermined distance (D) to a second reference location ($P_2$). After it is determined that the main body 1 has moved to the second reference location ($P_2$), the processor 8 controls the thermal detecting module 6 to detect the fire 90 and to generate a second reference image. Specifically, the second reference image is also a thermal image.

Figure 7:
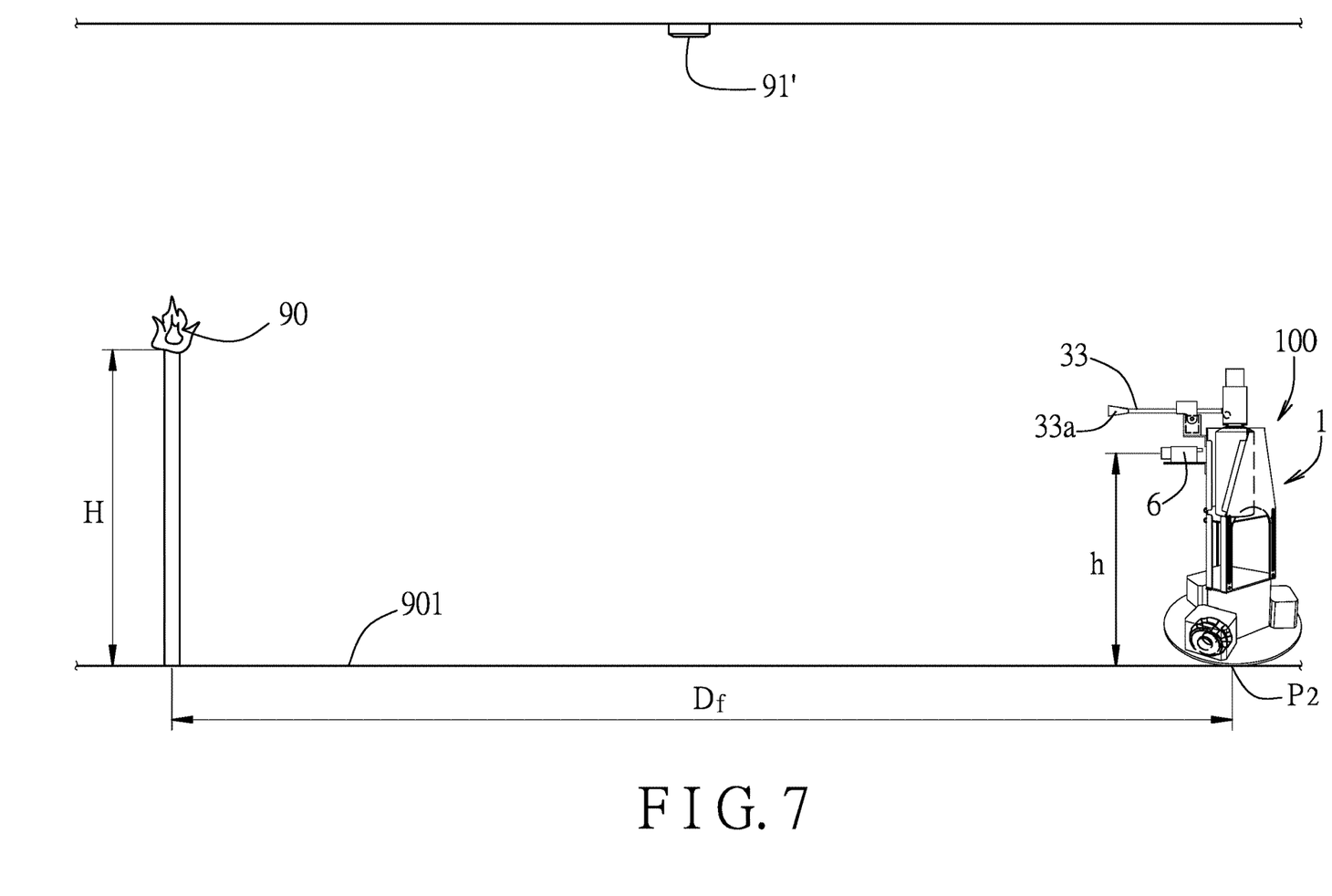
FIG. 7 is a schematic side view illustrating the spatial relationship between the movable smart fire extinguishing device and the fire.

Referring to FIG. 7, the processing module 81 is programmed to then calculate a distance to fire ($D_f$) between the fire 90 and the main body 1 at the second reference location ($P_2$), a height (H) of the fire 90 from a ground 901 of the specific area 900, based on image parts respectively of the first reference image and the second reference image that indicate a highest temperature.

Specifically, in this embodiment, the distance to fire ($D_f$) may be calculated using the following equation:

$$\frac{D_f + D}{D_f} = \frac{x_2}{x_1},$$

where $x_1$ represents a first ratio of a number of pixels of the image part of the first reference image to a number of pixels of the first reference image in the vertical direction, and $x_2$ represents a second ratio of a number of pixels of the image part of the second reference image to a number of pixels of the second reference image in the vertical direction. In this embodiment, the number of pixels of the first reference image in the vertical direction is the same with the number of pixels of the second reference image in the vertical direction, and the ratio $$\frac{x_1}{x_2}$$

may be regarded as a ratio of the number of pixels of the image part of the first reference image to the number of pixels of the image part of the second reference image.

The processing module 81 is programmed to, after the distance to fire ($D_f$) is obtained, calculate the height (H) of the fire 90 from the ground 901 of the specific area 900, based on at least the image parts respectively of the first reference image and the second reference image that indicate the highest temperature.

Specifically, in this embodiment, the height (H) of the fire 90 may be calculated using the following equation:

$$D_f = \frac{\frac{(h-H) \times 0.5 R_v}{x_v}}{\tan(0.5 A_V)},$$

where h represents a height of the thermal detecting module 6, $A_V$ represents a vertical angle of view of the FoV of the thermal detecting module 6 (which may be a known value, such as 39 degrees, that is related to a specification of the thermal detecting module 6), $R_v$ represents the number of pixels (i.e., a resolution) of the entire second reference image in the vertical direction (which may be a known value, such as 256, that is related to a specification of the thermal detecting module 6), and $x_v$ represents a number of pixels of a line segment from a location of the fire 90 in the second reference image to a central location of the second reference image in the vertical direction.

Figure 8:
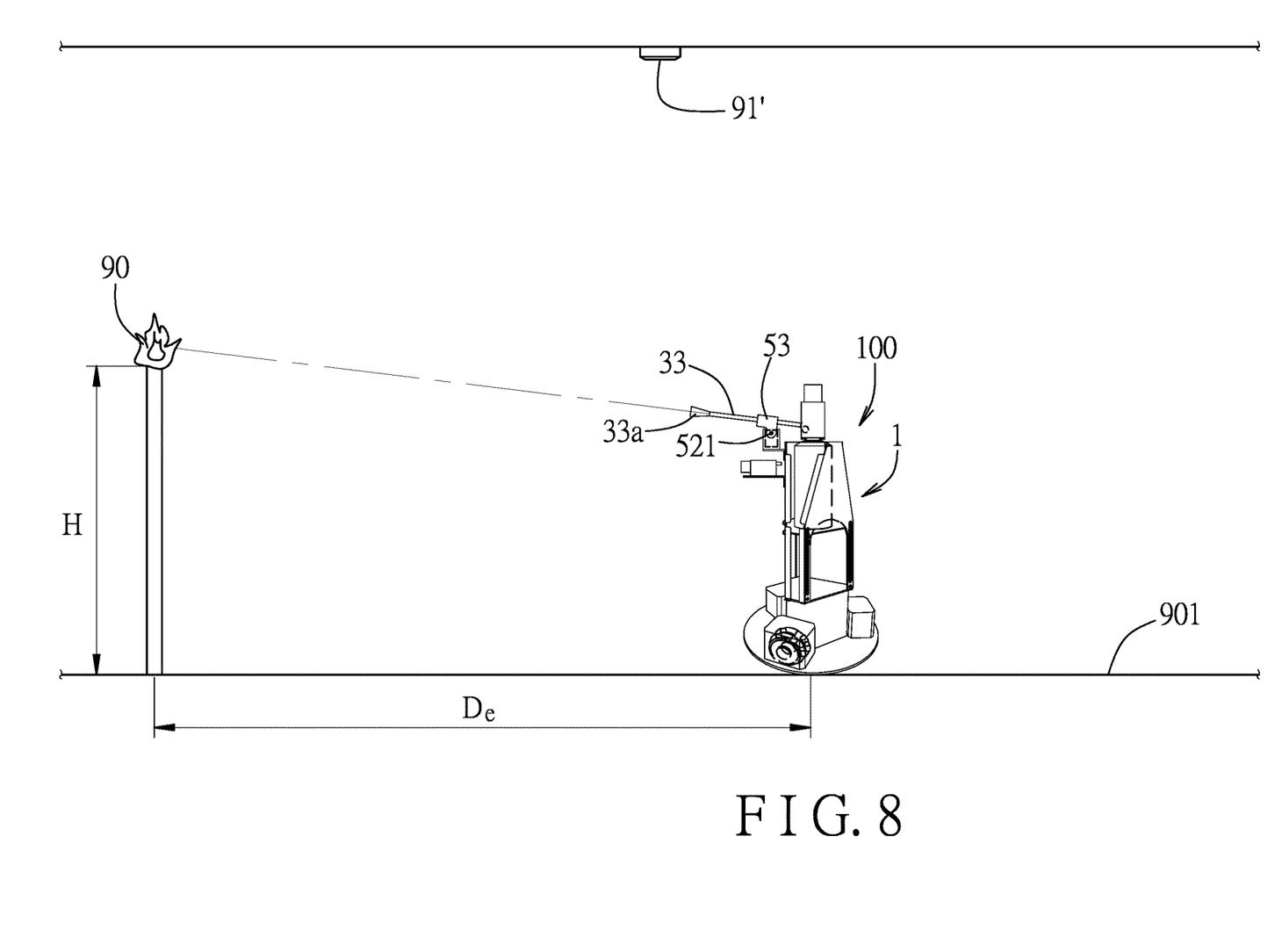
FIG. 8 is a schematic side view illustrating the movable smart fire extinguishing device spraying an extinguishing agent within a predetermined range from the fire.

Afterward, as shown in FIG. 8, the processor 8 controls the wheel-driving module 2 to drive the wheel set 111 to move the main body 1 to a location spaced apart from the fire 90 by a distance within a predetermined range ($D_e$). In this embodiment, it is recommended that the movable smart fire extinguishing device 100 start spraying the extinguishing agent when the movable smart fire extinguishing device 100 is within the predetermined range ($D_e$), so as to achieve a better effect of putting out the fire 90.

In the example of FIGS. 7 and 8, the distance to fire ($D_f$) may be 5 meters, and the predetermined range ($D_e$) may be 2 to 3 meters. Accordingly, the processor 8 has to control the wheel-driving module 2 to drive the wheel set 111 to move the main body 1 from the second reference location ($P_2$) toward the fire 90 by 2 to 3 meters.

Afterward, the processor 8 controls the tube-driving module 5 to move the nozzle 33a of the tube 33 to a spraying position based on the height (H) of the fire 90. Specifically, the processor 8 transmits a second control signal that indicates the spraying position to the tube-driving module 5, and in response, the motor 52 of the tube-driving module 5 drives the driving shaft 521 to rotate so as to move the nozzle 33a of the tube 33 to the spraying position. In the example of FIG. 8, the height (H) of the fire 90 is higher than a height of nozzle 33a of the tube 33 with respect to the ground 901 of the specific area 900, and accordingly, the spraying position is an elevated position.

Then, the processor 8 transmits the first control signal that indicates that the valve 32 should be switched to the release position to the electronic switching module 4. In response, the electronic switching module 4 switches the valve 32 to the release position, allowing the extinguishing agent to be discharge through the outlet 31 and the tube 33.

In one embodiment, the movable smart fire extinguishing device 100 further includes a video capturing module (not depicted in the drawings) facing the same side as the nozzle 33a. In one embodiment, the video capturing module and the thermal detecting module 6 are integrated as one component.

In this configuration, the processor 8 may be programmed to, in response to the location signal from the wireless transmission module 7, activate the video capturing module to start recording real-time video. The real-time video may be transmitted to the host computer 92, such that relevant personnel are able to see the real-time video and be notified of the fire 90 at a remote site.

In some cases (e.g., when the specific area 900 is an outdoor site), one or more positioning beacons may be disposed at different locations of the specific area 900. The positioning beacons are configured to communicate with the movable smart fire extinguishing device 100 so as to assist the movement of the movable smart fire extinguishing device 100.

To sum up, embodiments of the disclosure provide a movable smart fire extinguishing device that is capable of automatically performing operations associated with putting out a fire in a specific area. Specifically, the movable smart fire extinguishing device is configured to move near a fire, to turn to face the fire directly, to move within the predetermined range, and to start spraying the extinguishing agent at a spraying position. In this configuration, the spraying of the extinguishing agent may be done at a relatively calculated position, at a more optimized height, and without human involvement.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A movable smart fire extinguishing device for use with a fire detector disposed in a specific area to extinguish fire in the specific area, comprising:
    a main body including a base that includes a wheel set, and a frame that is mounted on said base;
    a wheel-driving module disposed on said base for driving said wheel set to move said main body within the specific area;
    an extinguisher placed in said frame and including
        a container that stores an extinguishing agent therein,
        an outlet that is connected to said container,
        a tube that is spatially connected to and extends from said outlet and that includes a nozzle (33a), and
        a valve that is disposed at said outlet, and that can be switched between a block position in which said valve blocks said outlet and a release position in which said valve opens up said outlet to allow the extinguishing agent to be discharged through said outlet and said tube;
    an electronic switching module disposed on said frame and configured to drive said valve to switch between the block position and the release position;
    a tube-driving module disposed on said frame and configured to move said nozzle (33a) of said tube in a vertical direction;
    a thermal detecting module disposed on said frame, facing a same side as said nozzle (33a) of said tube, and configured to detect fire within a field of view of said thermal detecting module and to generate an image of the fire;
    a wireless transmission module configured to receive a location signal associated with a first reference location in proximity of the fire detector; and
    a processor electrically connected to said wheel-driving module, said electronic switching module, said tube-driving module, said thermal detecting module and said wireless transmission module,
    wherein said processor is programmed to, in response to the location signal from said wireless transmission module,
        generate a movement control signal based on the location signal, and transmit the movement control signal to said wheel-driving module for enabling said wheel-driving module to drive said wheel set to move said main body to the first reference location,
        when it is determined that said main body is at the first reference location, control said thermal detecting module to detect fire and to generate a thermal image, and to calculate a target direction based on a line of sight of said thermal detecting module and the thermal image,
        control said wheel-driving module to rotate said main body such that the line of sight of said thermal detecting module is aligned with the target direction, and then control said thermal detecting module to detect the fire and to generate a first reference image,
        control said wheel-driving module to drive said wheel set to move said main body in the target direction by a predetermined distance to a second reference location, and then control said thermal detecting module to detect the fire and to generate a second reference image,
        calculate a distance to fire between the fire and said main body at the second reference location, a height of the fire from the ground of the specific area based on image parts respectively of the first reference image and the second reference image that indicate a highest temperature,
        control said wheel-driving module to drive said wheel set to move said main body to a location spaced apart from the fire by a distance within a predetermined range,
        control said tube-driving module to move said nozzle of said tube to a spraying position based on the height of the fire, and
        control said electronic switching module to switch said valve to the release position so as to discharge the extinguishing agent.

2. The movable smart fire extinguishing device of claim 1, wherein:
    when said main body is moved to the first reference location, said processor further controls said wheel-driving module to drive said wheel set to rotate said main body at the first reference location, controls said thermal detecting module to generate a plurality of thermal images, and calculates the target direction based on the plurality of thermal images.

3. The movable smart fire extinguishing device of claim 1, wherein said processor is programmed to:
    calculate the distance to fire based on a first ratio of a number of pixels of the part of the first reference image to a number of pixels of the first reference image in the vertical direction, a second ratio of a number of pixels of the part of the second reference image to a number of pixels of the second reference image in the vertical direction, and the predetermined distance; and
    calculate the height of the fire based on a height of said thermal detecting module from the ground, a horizontal angle of view of the field of view of said thermal detecting module, and a resolution of the second reference image in the vertical direction.

4. The movable smart fire extinguishing device of claim 3, wherein said processor includes:

a control module electrically connected to said wireless transmission module for receiving the location signal therefrom, and electrically connected to said wheel-driving module, said electronic switching module and said tube-driving module for controlling operations thereof; and a processing module electrically connected to said control module, and electrically connected to said thermal detecting module for receiving the image(s) generated by said thermal detecting module, said processing module being programmed to calculate the target direction, the height of the fire and the distance to fire, wherein said processing module is further programmed to transmit, to said control module, a signal indicating the target direction, and said control module is programmed to control said wheel-driving module to rotate said main body based on the signal from said processing module.

5. The movable smart fire extinguishing device of claim 1, wherein said tube-driving module includes:

a motor installation seat that is mounted on said frame;

a motor that is mounted on said motor installation seat, that includes a driving shaft extending horizontally and perpendicularly to said tube, and that is electrically connected to said processor; and a tube installation seat that is connected to said driving shaft and that is configured to co-rotate with said driving shaft and to allow said tube to be disposed therethrough, wherein said motor is controlled to drive said driving shaft to rotate, so as to move said tube installation seat, and move said nozzle of said tube to the spraying position.

6. The movable smart fire extinguishing device of claim 1, wherein, when it is determined that said main body is located at an initial location, said processor is programmed to generate the movement control signal that controls said wheel-driving module to drive said wheel set to move said main body to the first reference location along a fixed route.

7. The movable smart fire extinguishing device of claim 1, wherein said frame is formed with a containing space for containing said extinguisher therein.

8. The movable smart fire extinguishing device of claim 1, further comprising a battery module disposed on said base and electrically connected to said processor.

9. The movable smart fire extinguishing device of claim 1, wherein said thermal imaging module includes a thermographic camera.

* * * * *